(12) United States Patent
Muñoz Parraguez

(10) Patent No.: US 10,339,658 B1
(45) Date of Patent: Jul. 2, 2019

(54) METHOD FOR PERFORMING SEGMENTATION IN AN ORDERED SEQUENCE OF DIGITAL DATA

(71) Applicant: OCULUS MACHINA S.P.A., Las Condes (CL)

(72) Inventor: César Eduardo Muñoz Parraguez, Las Condes (CL)

(73) Assignee: Oculus Machina S.P.A., Las Condes (CL)

( * ) Notice: Subject to any disclaimer, the term of this patent is extended or adjusted under 35 U.S.C. 154(b) by 0 days.

(21) Appl. No.: 16/271,127

(22) Filed: Feb. 8, 2019

Related U.S. Application Data

(63) Continuation of application No. PCT/CL2017/050039, filed on Aug. 10, 2017.

(51) Int. Cl.
  *G06T 7/168* (2017.01)
  *G06F 17/11* (2006.01)
  *G06F 17/16* (2006.01)

(52) U.S. Cl.
  CPC .............. *G06T 7/168* (2017.01); *G06F 17/11* (2013.01); *G06F 17/16* (2013.01); *G06T 2207/20112* (2013.01)

(58) Field of Classification Search
  CPC ................... G06F 17/11; G06F 17/16
  See application file for complete search history.

(56) References Cited

U.S. PATENT DOCUMENTS

| | | | | |
|---|---|---|---|---|
| 2013/0249833 | A1* | 9/2013 | Christiansson | G06F 3/0428 345/173 |
| 2017/0220891 | A1* | 8/2017 | Kim | G06K 9/4628 |

\* cited by examiner

*Primary Examiner* — Edward Park
(74) *Attorney, Agent, or Firm* — McKee, Voorhees & Sease, PLC

(57) ABSTRACT

A method for making a segmentation in the sorted sequence of data (100), that comprises arranging a sequential stream of sorted input data (10), where the data are arranged in matrices (frames), in this case by way of a preferred example as a sequence of images for image analysis (20), and that delivers a sequential stream of sorted output data (30), where the sorted output data are arranged in sorted matrices.

10 Claims, 8 Drawing Sheets

| 23 | 54 |
|---|---|
| 54 | 71 |

| 32 | 32 | 75 | 75 |
|---|---|---|---|
| 32 | 32 | 75 | 75 |
| 75 | 75 | 100 | 100 |
| 75 | 75 | 100 | 100 |

| 0 | 4 | 8 | 12 | 16 | 20 | 24 | 28 | 32 | 36 | 40 | 44 |
|---|---|---|---|---|---|---|---|---|---|---|---|
| 4 | 8 | 12 | 16 | 20 | 24 | 28 | 32 | 36 | 40 | 44 | 48 |
| 8 | 12 | 16 | 20 | 24 | 28 | 32 | 36 | 40 | 44 | 48 | 52 |
| 12 | 16 | 20 | 24 | 28 | 32 | 36 | 40 | 44 | 48 | 52 | 56 |
| 16 | 20 | 24 | 28 | 32 | 36 | 40 | 44 | 48 | 52 | 56 | 60 |
| 20 | 24 | 28 | 32 | 36 | 40 | 44 | 48 | 52 | 56 | 60 | 64 |
| 24 | 28 | 32 | 36 | 40 | 44 | 48 | 52 | 56 | 60 | 64 | 68 |
| 28 | 32 | 36 | 40 | 44 | 48 | 52 | 56 | 60 | 64 | 68 | 72 |
| 32 | 36 | 40 | 44 | 48 | 52 | 56 | 60 | 64 | 68 | 72 | 76 |
| 36 | 40 | 44 | 48 | 52 | 56 | 60 | 64 | 68 | 72 | 76 | 80 |
| 40 | 44 | 48 | 52 | 56 | 60 | 64 | 68 | 72 | 76 | 80 | 84 |
| 44 | 48 | 52 | 56 | 60 | 64 | 68 | 72 | 76 | 80 | 84 | 100 |

Entrada = Input

| 0 | 20 | 40 | 60 | 80 | 100 | 100 | 100 | 100 | 100 | 100 | 100 |
|---|---|---|---|---|---|---|---|---|---|---|---|
| 20 | 40 | 60 | 80 | 100 | 100 | 100 | 100 | 100 | 100 | 100 | 100 |
| 40 | 60 | 80 | 100 | 100 | 100 | 100 | 100 | 100 | 100 | 100 | 100 |
| 60 | 80 | 100 | 100 | 100 | 100 | 100 | 100 | 100 | 100 | 100 | 100 |
| 80 | 100 | 100 | 100 | 100 | 100 | 100 | 100 | 100 | 100 | 100 | 100 |
| 100 | 100 | 100 | 100 | 100 | 100 | 100 | 100 | 100 | 100 | 100 | 100 |
| 100 | 100 | 100 | 100 | 100 | 100 | 100 | 100 | 100 | 100 | 100 | 100 |
| 100 | 100 | 100 | 100 | 100 | 100 | 100 | 100 | 100 | 100 | 100 | 100 |
| 100 | 100 | 100 | 100 | 100 | 100 | 100 | 100 | 100 | 100 | 100 | 100 |
| 100 | 100 | 100 | 100 | 100 | 100 | 100 | 100 | 100 | 100 | 100 | 100 |
| 100 | 100 | 100 | 100 | 100 | 100 | 100 | 100 | 100 | 100 | 100 | 100 |
| 100 | 100 | 100 | 100 | 100 | 100 | 100 | 100 | 100 | 100 | 100 | 100 |

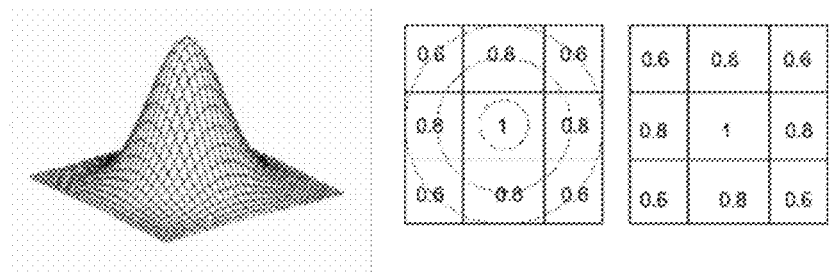
Figure 5A
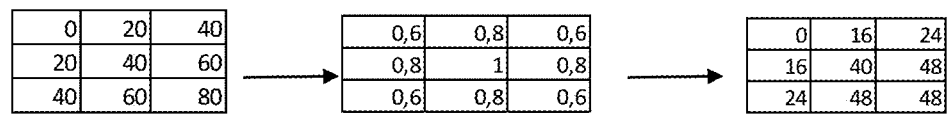
Figure 5B
| A | B | B | A | A | B |
| A | B | A | B | B | A |
| B | B | A | A | B | A |
| A | A | B | A | A | B |
| B | B | A | B | B | A |
| A | A | B | B | A | B |
Figure 6A

| 23 | 54 | 95 | 100 | 88 | 100 |
|----|----|----|-----|----|-----|
| 54 | 71 | 88 | 88 | 75 | 88 |
| 95 | 88 | 100 | 100 | 88 | 100 |
| 100 | 88 | 100 | 100 | 88 | 100 |
| 88 | 75 | 88 | 88 | 75 | 88 |
| 100 | 88 | 100 | 100 | 88 | 100 |
Figure 6B
| A | B | B | A | A | B |
|---|---|---|---|---|---|
| A | B | A | B | B | A |
| B | B | A | A | B | A |
| A | A | B | A | A | B |
| B | B | A | B | B | A |
| A | A | B | B | A | B |
Figure 6C
| 0 | 0 | 0 | 1 | 1 | 0 |
|---|---|---|---|---|---|
| 1 | 0 | 1 | 0 | 0 | 1 |
| 0 | 0 | 1 | 1 | 0 | 1 |
| 1 | 1 | 0 | 1 | 1 | 0 |
| 0 | 0 | 1 | 0 | 0 | 1 |
| 1 | 1 | 0 | 0 | 1 | 0 |
Figure 6D
Figure 7
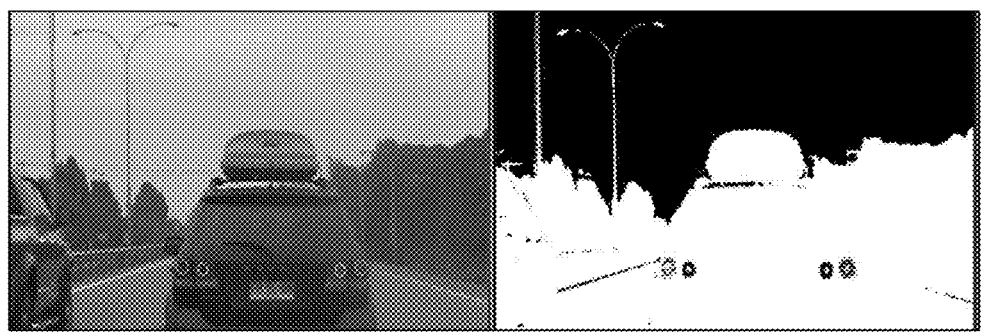
Figure 8

METHOD FOR PERFORMING SEGMENTATION IN AN ORDERED SEQUENCE OF DIGITAL DATA

CROSS-REFERENCE TO RELATED APPLICATIONS

This application is a Continuation Application of PCT/CL2017/050039, filed Aug. 10, 2017, which claims priority to Chilean Application No. 201602047, filed Aug. 12, 2016, the contents of which are hereby incorporated by reference in its entirety.

SCOPE OF THE APPLICATION

The present invention pertains to the detection of elements within a sorted sequence of data, such as an image or a data matrix, audio or video data. More specifically, a method for performing a segmentation in a sorted sequence of data.

DESCRIPTION OF THE PRIOR ART

At present, industrial activity requires better control tools to control its processes, to which end real-time image analysis of an online process is an essential tool for controlling failures and increasing efficiency; for example, a fleet of autonomous mining vehicles must have optimal control of their environment in order to be able to deploy such vehicles, meaning that the processing of work contour images must yield relevant information for the fleet's movement and operation; large scale plantations also need to have timely information as to the status of the plants, so an aerial image is essential for assessing them, while being able to detect the fruit's quality and health conditions. It is evident that digital image analysis is a tool that allows for greater efficiency in a wide variety of industrial processes.

Patent application US 2012207376 dated Aug. 16, 2012 by Garrote et al, entitled "Bioinspired System for Image Processing," describes a method for processing a bioinspired digital image and includes an architecture that emulates the functions of a primate's photoreceptors, horizontal cells, bipolar cells and retinal ganglion cells based on an image as input. The method detects the edges and surface properties present in the digital image. The output is a dataset that includes photoreceptor emulators that emulate the photoreceptor cells, and is connected to the data input. Each emulator includes a cell-based structure with a modulated data input, a computing center to process the modulated data and an output of the data processed by the computing center, and emulators that form a virtual retina in which each emulator is parametrized.

Patent application US 2002168100 dated Jan. 14, 2002, by Roger Woodall entitled "Spatial Image Processor" describes a neural network for a spatial image processor for processing image data to discriminate between first and second spatial configurations of the component objects, that includes an input matrix to convert an input image into pixel data and send the data to a localized gain network (LGN) module, a memory in parallel with a processor and a neuronal arrangement to receive the pixel data and the processing of the pixel data in component recognition vectors and chaotic oscillators to receive the recognition vectors and to send the feedback data to the LGN module as attention activations. The network also includes a spatial-temporal retina to receive both the pixel data and the temporary feedback activations and to generate temporary space vectors, which are processed by a temporary parallel processor in temporary component recognition vectors. A matrix of spacial recognition vectors receives the recognition vectors from the temporary component and forms an object representation of the first set of objects that comprise it.

None of the cited documents discloses or teaches a method for performing a segmentation in a sorted sequence of digital data to detect elements within said sorted sequence of data that can correspond to an image or data matrix, audio or video data.

SUMMARY OF THE INVENTION

An object of the invention is to perform a segmentation in a sorted sequence of digital data, which comprises applying a first transformation to a first matrix, which is the first of a sequential sorted data input stream, which has three options: reduction, maintenance, or amplification, which results in obtaining a second matrix, wherein the first option of a first reduction transformation, consists in each element of the first matrix being linked in a p:q ratio with the second matrix, where p elements of the first matrix can be projected into q elements of the second matrix; the first reduction transformation is applied in a stationary way, i.e. each sector of p elements of the first matrix generates an element q in the second matrix; the second option of a first maintenance transformation comprises each element of the first matrix being copied in the second matrix; the third option of a first amplification transformation consists of each element of the first matrix being linked in a p:q ratio with the second matrix, where p elements of the first matrix can be projected into q elements of the second matrix; where each element p of the first matrix generates q new elements of the second matrix; application of a second transformation to the second matrix, which consists of a truncated ramp function, the result of which is a third matrix; application of a third transformation to the third matrix to generate a fourth matrix, where the third transformation consists of applying a discretized Gaussian filter; where each element of the third matrix generates a new element in the fourth matrix; application of a fourth reduction transformation to the fourth matrix to obtain a fifth matrix; application of a fifth binarization transformation to the fifth matrix to obtain a sixth matrix; where the binarization transformation consists of binarizing each element of the fifth matrix to the corresponding element in the sixth matrix, based on whether the element's value is greater than or less than 50% of the maximum value of the fifth matrix, which comprises bringing a 1 or 0 value of the fifth matrix's element to the corresponding element in the sixth matrix, based on whether the value of the element is greater than or less than 50% of the maximum value of the fifth matrix; applying a sixth reduction transformation matrix to the sixth matrix to obtain a seventh matrix; applying a seventh transformation to the seventh matrix to obtain an eighth matrix, which consists of binarizing each element in the seventh matrix, which in turn comprises bringing a 1 or 0 value of the seventh matrix's element to the corresponding element in the eighth matrix, based on whether the value of the element is greater than or less than 50% of the maximum value of the seventh matrix; and where the eighth matrix becomes the output matrix belonging to the sequentially sorted data output stream, and the information contained in the eighth matrix sequentially sorted data output stream represents the zones or segments with information that delimits the elements which constitute the image or sequentially sorted data output stream. Furthermore, in the first reduction transformation after previously having determined a maximum value, which is the maximum sum among all p sets of elements in the first matrix, the p elements in the first matrix which are placed in the q element of the second matrix, and a percentage average is weighted as the sum of the p values divided by the maximum sum, which is what obtains the q value. The first reduction transformation is performed for each sector of elements of the first matrix, which generates an element in the second matrix, p/2 elements are displaced horizontally or p/2 elements are displaced vertically to form the second matrix; in addition, the first reduction transformation can be performed with overlap, wherein each of the first matrix's sector of elements, which generate an element in the second matrix, displace an element horizontally or an element vertically, to form the second matrix. In one option, the first amplification transformation is performed with a p:q amplification ratio; the value of the q element to be generated is determined as follows: a p sector of elements from the first matrix is taken to generate p×q new elements in the second matrix; the highest value of the p elements is determined, and then the value of each p element is divided by the highest value and is normalized by 100, and the value obtained is placed q times in the second matrix's corresponding sector. The truncated ramp function has input values, where values above 20% of maximum value take on a value of 100 or maximum; values below 20%, are multiplied by the ramp function, with a slope m=5; so any value between 0 and less than 20 is multiplied by 5, and in this way the value of each element of the second matrix is transformed into a value in the element of the third matrix. The discretized Gaussian filter consists of multiplying each of the elements of the third matrix by the values set in a matrix section of the discretized Gaussian filter, which generates a new value in each element, which is linearly dependent on the original value and on surrounding elements, the discretized Gaussian filter is modeled by a x×y matrix with element values that are dependent on the size of the matrix, and which are obtained experimentally. For the center of the x×y matrix the value is normalized to 1 and the peripheral values used are defined between 0 and 1, where the discretized Gaussian filter is based on the formula: $z=b*exp(-a*x^2-a*y^2)$; where the constants a and b are experimentally obtained. The binarization is of a positive type, meaning that if the element's value is greater than 50% of the maximally valued element of the fifth matrix, this element becomes 1, and otherwise becomes 0; and another of the negative type, meaning that if the value of the element is greater than 50% of the fifth matrix's maximum value, this element becomes 0, and otherwise becomes 1. For the application of the binarization, first the maximum value among the fifth matrix's elements is determined, then a pattern of the types of positive or negative binarization is defined for each element of the fifth matrix, which is performed randomly, allocating 50% to each type of binarization, and the seventh binarization transformation is of the positive type. It is the case that the sequential stream of sorted input data (10), may correspond to a sequence of audio or video data or to a digital image.

BRIEF DESCRIPTION OF THE DRAWINGS

FIGS. 5A and 5B describe a discrete Gaussian filter applied to a third matrix transformation.
FIGS. 6A-6D describe a fifth matrix transformation using binarization.
FIG. 7 describes an applied example of a highway in real time.
FIG. 8 describes an applied example of detecting or segmenting cars or trucks.

DESCRIPTION OF A PREFERRED EMBODIMENT

The present invention relates to the detection of elements within a sorted sequence of data, such as an image or a digital data matrix of digital data, audio or video data, obtained from an external source, such as an image taken with a photographic camera or similar, a video recorded with a digital video camera or similar, or a digitally recorded audio file, etc. The detection of such elements within the sorted sequence of data which is obtained is achieved by using a method for performing a segmentation in the sorted sequence of data (100).

The method for performing a segmentation in the sorted sequence of data (100) carries out the analysis of a matrix as a sorted element or a frame, for example of a digital image, which is capable of delivering edge detection or contour and segmentation detection of the digital image or of a sorted sequence of data for its comparison, analysis, segmentation, classification, etc.

Each matrix that makes up an elements structure $e(i,j,k)$ that represent the elements of each matrix, where i is an integer value between 1 and M that represents the horizontal position within the matrix, and j is an integer value between 1 and N that represents the vertical position within the matrix, and k is an integer value between 1 and P that represents the depth within the matrix; this is a digital structure whose value represents a pixel of information or a quantification of the information obtained from an external source and stored at a depth of "n" bits, for example 1, 2, 4, 8, 12, 16; preferably values of 1, 8 and 12 bits are used for the information stored in the data matrix obtained from an external source.

The segmentation method consists of obtaining chunks of the original sequence with information based on user-defined parameters. In an example case, in a digital image of a landscape the zones which delimit a tree, a mountain, the sky, a road, etc. can be delivered; in an example of a sequence of audio data, chunks of audio corresponding to a particular voice, or of a sound from a specific source (an animal, wind, etc.) can be segmented. In both cases the analysis can be performed either directly or through a mathematical relationship to the input, transforming the original data into a new input.

Figure 1:
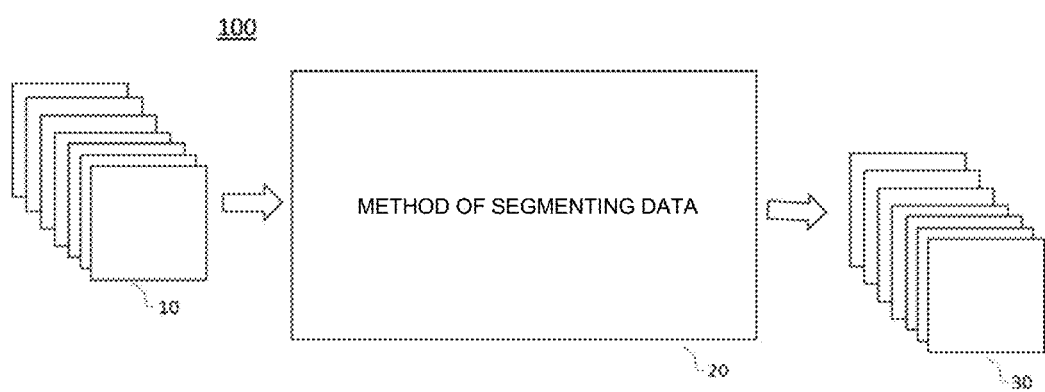
FIG. 1 describes the basic method of the invention.

FIG. 1 shows schematically the method for performing a segmentation in the sorted sequence of data (100) that comprises arranging a sequential stream of sorted input data (10), where the data are arranged in matrices (frames). In this case of a preferred example, as a sequence of images for image analysis (20) and that delivers a sequential stream of sorted output data (30), where output data are arranged in sorted matrices.

Figure 2:
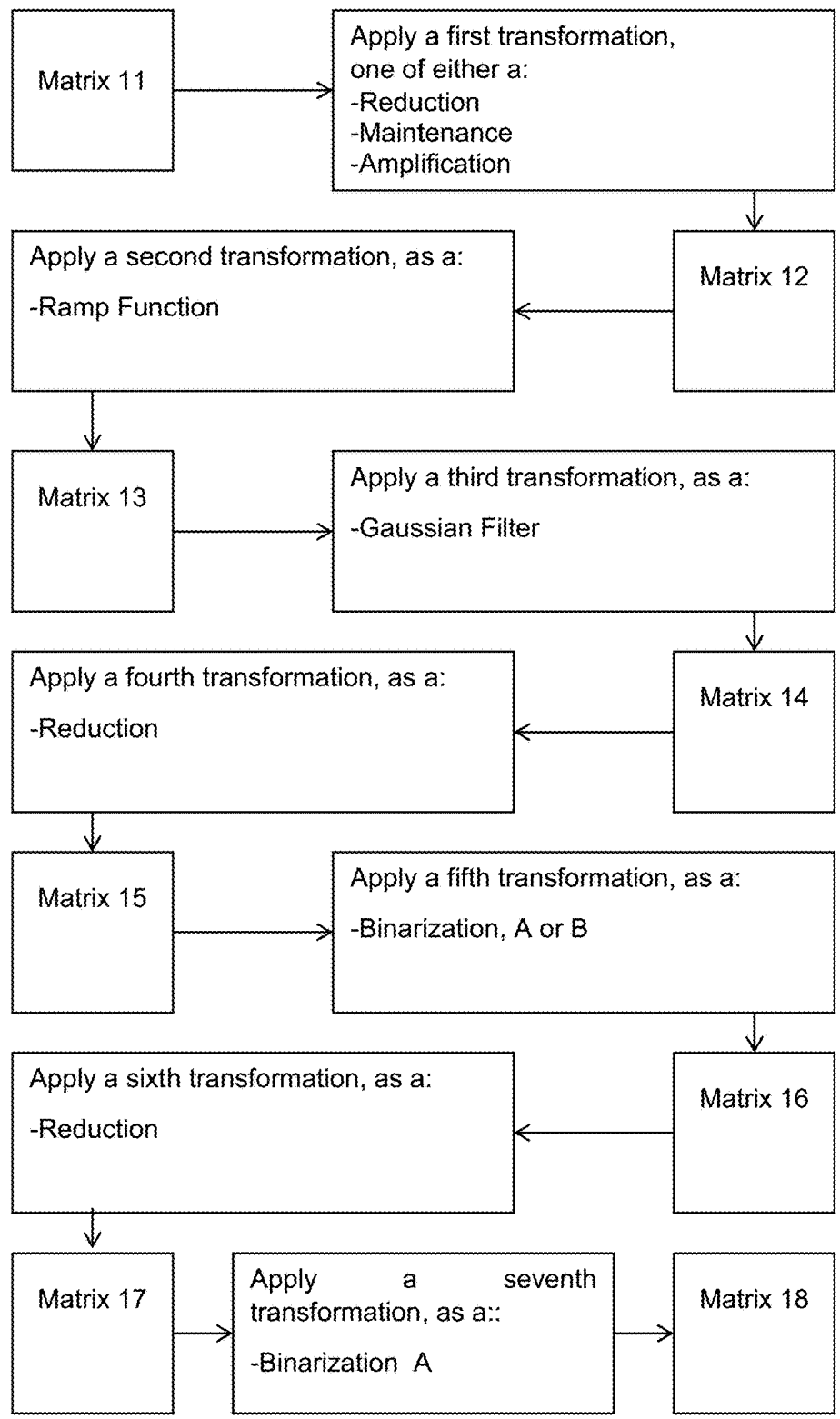
FIG. 2 describes the method of the invention with its stages.

FIG. 2 depicts the method's flowchart (20) for performing a segmentation in the sorted sequence of data (100) with its stages; the sequential stream of sorted input data (10), which is sorted in a sequence of data matrices m×n×p, where m is an integer value greater than 100 that represents the width of the input data of each data matrix, n is an integer value greater than 100 that represents the height of the input data of each data matrix, and p is an integer value greater than or equal to 1 that represents the depth information of the input data of each data matrix. In a preferred example, values of 320×240, 640×480, 800×600, 1280×960×1, 1680×1050×1, 1920×1280×1 or other image or sorted sequence of data configurations are used. In this way the sequential stream of sorted input data (10) represents a sequence of data matrices m×n×p where each data matrix is sequentially analyzed.

Figures 3A, 3B, 3C:
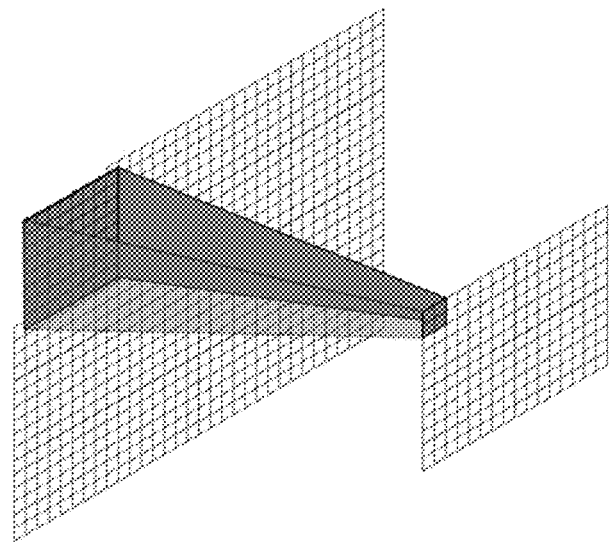
FIGS. 3A-3E describe a first transformation of the matrices.
Figures 3D, 3E, 4A:
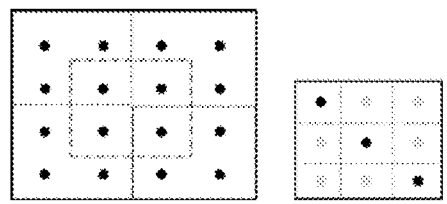
FIGS. 4A-4C describe a second transformation of the matrices.

The first stage begins with a matrix (11), which is the first of the sequential streams of sorted input data (10), a first transformation is applied to said matrix (11). The transformation offers three options: reduction, maintenance or amplification, and the result of the transformation returns a matrix (12). The first option of a first reduction transformation consists of each element of the matrix (11) being linked in a p:q ratio with the matrix (12), where p matrix elements (11) can project themselves into q matrix elements (12); in general, typical matrix (11) values are: 320×240, 640×480, 800×600, 1024×720, 1280×960, 2560×1980, or any value of A×B greater than 100×100; in a preferred mode, matrix (11) with dimensions of 1280×960×1 is processed in a ratio of p=4:q=1 to obtain a matrix (12) with dimensions of 640× 480×1; the reduction ratio of p=4:q=1 affects the width and height, while the depth is retained; in a preferred mode it is held that each side was reduced by factor of 2, going from dimensions of 1280×960×1 to dimensions of 640×480×1, while maintaining the depth; i.e. from 4 matrix elements (11) we arrive at 1 element in matrix (12); this is due to the geometric relationship of a quadrilateral area, where by reducing each side by half the total area is reduced to one quarter of the original area; FIG. 3A schematically shows a sector of elements in the matrix (11) which are placed in the matrix (12), with a 4:1 reduction; FIG. 3B shows, by way of example, the values 0, 16, 16, 40, of a sector of the matrix (11) that become a single value 23; previously a maximum value is determined, which is the maximum sum among all of the 4 element sets, as is shown in FIG. 3B, the maximum sum set is 100, 80, 80, 60, which yields a maximum value of 320; to arrive at the value of 23 as a matrix element (12), an average percentage is weighted as the sum of the values 0, 16, 16, 40, divided by the maximum sum 320, thereby arriving at the value of 23. The first reduction transformation is applied in a stationary manner, i.e. each four elements sector of the matrix (11) generates an element in matrix (12); however, a first reduction transformation with overlap can be generated, which means that each four element sector of matrix (11), which generates an element in the matrix (12) where two elements are displaced horizontally and two elements are displaced vertically to form matrix (12), instead now only one element is displaced horizontally and one element is displaced vertically to form matrix (12), whereby the reduction is, in itself, minimal; the values are obtained in the same manner as already indicated. The figure schematically shows the result of performing the first reduction transformation with overlap, where a 16 element sector is reduced to nine elements. The second option of a first maintenance transformation is that each element of matrix (11) is copied to matrix (12). In a preferred mode, matrix (11) with dimensions of 1280×960×1 is transformed using a p=1:q=1 ratio with matrix (12) of dimensions 1280×960×1. The third option of a first amplification transformation, for example using a p=1:q=4 ratio, which thereby returns a ratio from matrix (11) of dimensions 1280×960×1 to matrix (12) of dimensions 2560×1920×1; and consists of each element of data matrix (11) generating four new elements of matrix (12). In a preferred mode, both the width and the height of the matrix (11) of dimensions 1280×960×1, is multiplied by 2, maintaining the depth; and matrix (12) goes on to have dimensions of 2560×1920×1 whereby an amplification ratio of p=1:q=4 is obtained. The value of the element value to be generated is determined as follows: a 4 element sector of matrix (11) is taken to generate 16 new elements in matrix (12), the highest value of the 4 elements is determined, in this case being 71, then the value of each element is divided by the highest value and is normalized by 100, and the value obtained is placed in the matrix (12) sector 4 times, as is shown in FIG. 3E. The type of first transformation to apply depends on the sequence's size of and format, depending on the determined objective. For instance, looking for a specific segmentation allows for reduced processing time, so the user must evaluate which of the three options to adopt.

Figures 4B, 4C:
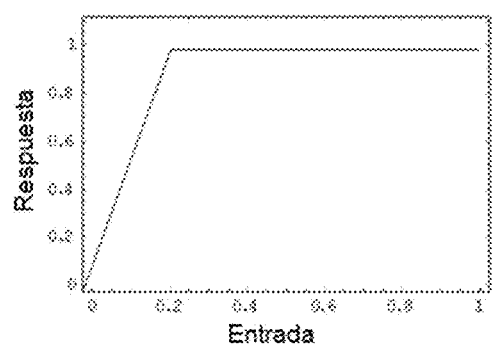

The second stage begins with a matrix (12), obtained with one of the methods described above; a second transformation is then applied to said matrix (12), an example of which is shown in FIG. 4A, consisting of a truncated ramp function, as shown in FIG. 4B, which returns a matrix (13). The truncated ramp function has input values, where values above 20% of maximum value take on a value of 100 or maximum; values below 20%, are multiplied by the ramp function, with a slope m=5; so any value between 0 and less than 20 is multiplied by 5, and in this way the value of each element of the matrix (12) is transformed into a value in the element of matrix (13), as shown in FIG. 4C, and whereby the resulting matrix (13) is the same size as matrix (12).

The third stage begins with a matrix (13), obtained in the previous stage, and a third transformation being applied to matrix (13) whereby matrix (14) is generated. The third transformation consists of applying a discretized Gaussian filter, as shown in FIG. 5A, and a transformation and transfer of matrix information is performed. The implementation of the Gaussian filter consists of multiplying each of the matrix elements (13) by the values set in the discretized Gaussian filter matrix section, which generates a new value in each element, said values being linearly dependent on the original value and on surrounding elements, as shown in FIG. 5B; in the case of a preferential example, the discretized Gaussian filter is modeled by a 3×3 matrix with element values defined in FIG. 5A. These values are dependent on the size of the matrix and are experimentally obtained. For the center of the 3×3 matrix a normalized value of 1 will be used, and the peripheral values will be defined between 0 and 1. By doing this the discretized Gaussian filter matrix section is applied, in the same way as the maintenance transformation, whereby matrix (14) is obtained. The Gaussian filter employed is based on the formula: $z=b*\exp(-a*x^2-a*y^2)$; in the example, the experimentally obtained constants used are a=0.2 and b=1. By discretizing in a 3×3 matrix the discretized Gaussian filter values shown in FIG. 5A are obtained. In a case of wanting to use a 5×5 matrix, this same function can be used to obtain its elements. It is important that the matrix dimension be an odd number as this allows for a single center to be obtained in the discretized Gaussian filter matrix.

The fourth stage is begun with the matrix (14) obtained in the previous stage. A fourth transformation is applied to matrix (14) to generate matrix (15). The fourth transformation consists of applying a reduction transformation to obtain matrix (15), as described in the first stage.

The fifth stage begins with the matrix (15) obtained in the previous stage, and a fifth transformation is applied to matrix (15) and matrix (16) is generated; the fifth transformation consists of binarizing each element of matrix (15) which entails taking the 1 or 0 value of the matrix (15) element to the corresponding matrix (16) element, based on whether the element's value is greater or less than 50% of the maximum matrix (15) value. 2 types of binarizations are defined. One is type A, or positive, which corresponds to whether the element's value is greater than 50% of the maximum matrix (15) value, in which case it becomes a 1, or otherwise becomes 0. Type B or negative binarization works as follows: if the element value is greater than 50% of the matrix's (15) maximum value, this element transforms to 0, and otherwise it becomes a 1. For the application of the described binarization, first the maximum value within the matrix elements (15) is determined, then a pattern of the types of A or B binarization for each element of the matrix (15) is defined, which is performed in a random way, allocating 50% to each type of binarization. An example of a distribution pattern is shown in FIG. 6A, which is generated from a distribution like the one shown in FIG. 6B, where the previously determined maximum value, which in this example is 100, is then applied to the distribution in FIG. 6C, and lastly the transformation is performed, which results in the values in FIG. 6D; with FIG. 6D being matrix (16).

The sixth stage is begun with the matrix (16) obtained in the previous stage. A sixth transformation is applied to matrix (16) to generate matrix (17). The sixth transformation consists of applying a reduction transformation to obtain matrix (17), as described in the first and fourth stages.

Note: When applying a reduction transformation which contains binary elements, and given that the reduction operation used is the sum of the elements, the resulting matrix will not be binary. For example, if we have a 4:1 transformation, and the first 4 elements of the input matrix are ones, and they are reduced to the first element of the output matrix, this value will be 4. Therefore, the resulting matrix will not have binary elements, and a new binarization must be applied.

The seventh stage begins with the matrix (17) obtained in the previous stage, and a seventh transformation is applied to matrix (17) and matrix (18) is generated; the seventh transformation consists of binarizing each element of matrix (17) which entails taking a 1 or 0 value of a matrix (17) element to the corresponding matrix (18) element, based on whether the element's value is greater or less than 50% of the maximum matrix (15) value, where the binarization is of type A, or positive, employed in the fifth stage, which means that if the element's value is greater than 50% of the maximum matrix (17) value then this element becomes 1, and otherwise it becomes 0.

In the previously described method, in matrix (14) to matrix (15) it is held that each element of these matrices takes a set of elements from the previous matrix and relates them in accordance with the p:q ratio, as has been explained in the corresponding stages. In addition, the p:q ratio can be performed using an overlap of matrix (14) elements to matrix (15). The level of overlap is experimentally determined, and can be greater than or equal to zero. This means that each element can belong to one or more matrices, for example, the first element of matrix (15), e27(1,1,1), corresponds with 4 elements of matrix (14), e25(1,1,1), e25(1,2,1), e25(2,1,1), e25(2,2,1); the second element of matrix (14), e27(1,2,1), corresponds with 4 elements of matrix (15), e25(2,1,1), e25(3,1,1), e25(2,2,1), e25(3,2,1), of which 2 elements are overlapped, i.e. elements e25(2,1,1), e25(2,2,1), belong to 2 matrices in matrix (15).

Lastly, matrix (18) becomes the output matrix for the sequential stream of sorted output data (30) of Q×R×S dimensions, where Q is an integer value greater than one that represents the width of the sorted output data (30), R is an integer value greater than one that represents the height of the sorted output data (30), S is an integer value greater than or equal to one that represents the depth information of the sorted output data (30). In the preferred example, values of 320×240×1 are used. The information contained in matrix (18) of the sequential stream of sorted output data (30) represents the zones or segments with information delimiting the constituent elements of the image or sequential stream of sorted output data (30).

Matrix (18) belonging to the sequential stream of sorted output data (30) can be geometrically referenced on the sequential stream of sorted input data (10), depending on the configuration of the original data stream (linear, two-dimensional, three-dimensional, etc.), while respecting the p:q accumulation factors used in the stages described above.

Examples of Use

For the analysis of a highway in real time, as shown in FIG. 7, emerging line forms which define the lanes can be detected and used for automatic tracking in an autonomous navigation system.

In the case of detecting or segmenting cars or trucks, as shown in FIG. 8, they can be permanently monitored within the visual field as with a sequential stream of sorted input data (10).

Figure 9:
FIG. 9 describes an example of detecting or segmenting people in an environment.

In the case of detecting or segmenting people in an environment, as shown in FIG. 9, peoples' silhouettes can be detected in an emergent form.

Figure 10:
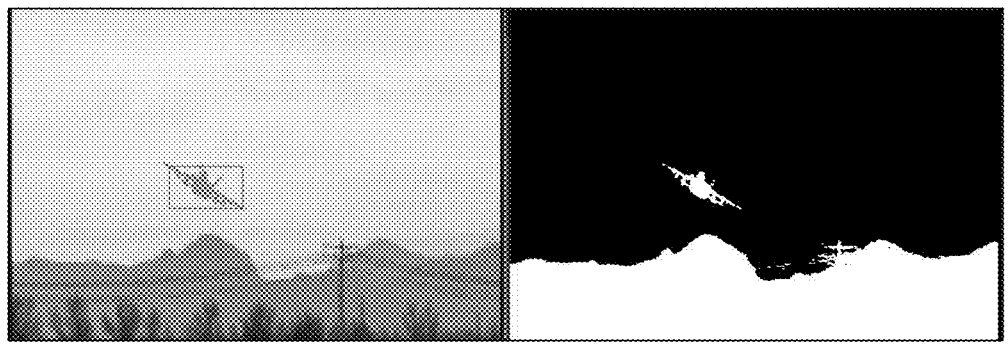
FIG. 10 describes an example of the segmentation of flying elements.

In the case of detecting or segmenting elements, both elements of interest and floating elements can be detected. FIG. 10 shows how the silhouette of an airplane, clouds, and the sky/mountain boundary can be simultaneously detected.

Figure 11:
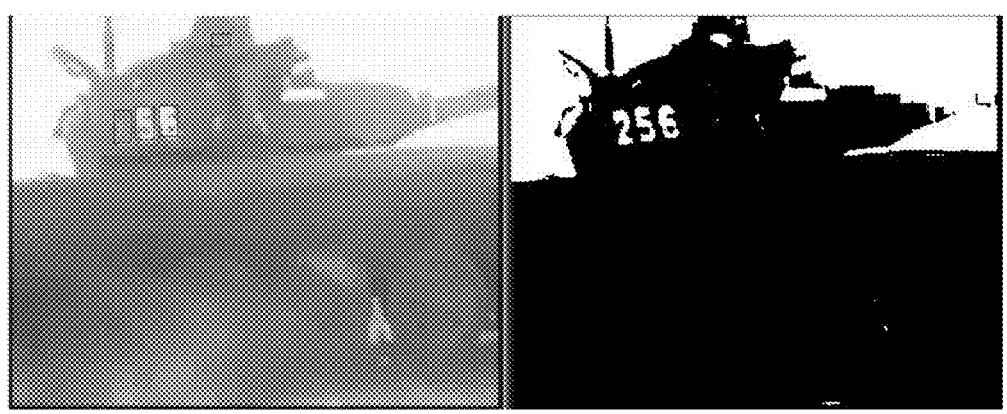
FIG. 11 describes the identification of graphic elements of interest.

In the case of detecting or segmenting symbols within an environment, as shown in FIG. 11, numbers or letters or other graphic elements of interest can be differentiated.

Obtaining the edges of the relevant elements in the images is achieved through the application of the transformations disclosed in the method which return an emergent output or result. In a comparison with traditional artificial vision techniques, this method would be equivalent to applying a retinal filter to the images.

The foregoing is based on the fact that in the case of biological eyes nature does it this way, and our model is a method that partially replicated biological characteristics. There is no method that describe the entire process of obtaining edges, as the results are obtained through the multiple transformations described, with these results being used in obtaining the emerging edge forms. While there are other edge detection techniques in the traditional artificial vision field they require high levels of computing power and are not a linear process, unlike the method described herein.

The invention claimed is:

1. A method for performing segmentation in a sorted sequence of digital data, characterized in that it comprises:
   applying to a first matrix (11), which is the first of a sequential stream of sorted input data (10), a first transformation that has three options: reduction, maintenance, or amplification, and as a result of which a second matrix (12) is obtained, where the first option of a first reduction transformation comprises each element of the first matrix (11) being linked in a p:q ratio with the second matrix (12), where p elements of the first matrix (11) con project into q elements of the second matrix (12); the first reduction transformation being applied in a stationary way, i.e. each sector of p elements of the first matrix (11) generate an element q in the second matrix (12); the second option of a first maintenance transformation comprises each element of the first matrix (11) being copied in the second matrix (12); the third option of a first amplification transformation comprises each element of the first matrix (11) being linked in a p:q ratio with the second matrix (12), where p elements of the first matrix (11) can project themselves into q elements of the second matrix (12); where each element p of the first matrix (11) generates q new elements in the second matrix (12);

applying a second transformation, consisting of a truncated ramp function, to the second matrix (12), which results in obtaining a third matrix (13);

applying a third transformation to the third matrix (13) to generate a fourth matrix (14), where the third transformation comprises the application of a discretized Gaussian filter; where each element of the third matrix (13) generates a new element in the fourth matrix (14);

applying a fourth reduction transformation to the fourth matrix (14) to obtain a fifth matrix (15);

applying a fifth binarization transformation to the fifth matrix (15) to obtain a sixth matrix (16); where the binarization transformation comprises binarizing each element of the fifth matrix (15) into the corresponding element in the sixth matrix (16), based on whether the element's value is greater than or less than 50% of the fifth matrix's (15) maximum value, which comprises taking a 1 or 0 value of the fifth matrix (15) element to the corresponding element in the sixth matrix (16), based on whether the element's value is greater than or less than 50% of the maximum fifth matrix's (15) value;

applying a sixth reduction transformation to the sixth matrix (16) to obtain a seventh matrix (17);

applying a seventh transformation to the seventh matrix (17) to obtain an eighth matrix (18), which comprises binarizing each element of the seventh matrix (17) to take a 1 or 0 value of the seventh matrix (17) element to the corresponding element in the eighth matrix (18), based on whether the element's value is greater than or less than 50% of the maximum seventh matrix's (17) value; and where the eighth matrix (18) becomes the output matrix for the sequential stream of sorted output data (30), and the information contained in the eighth matrix (18) of the sequential stream of sorted output data (30) represents the zones or segments containing information delimiting the image's constituent elements, or the sequential stream of sorted output data (30).

2. The method according to claim 1, characterized in that in the first reduction transformation a maximum value is previously determined, which is the maximum sum among all the sets of p elements in the first matrix (11), the p elements in the first matrix (11) which are placed in the q element of the second matrix (12), and a percentage average being weighted as the sum of the p values divided by the maximum sum, to obtain the value of q.

3. The method according to claim 1, characterized in that the first reduction transformation is performed for each element sector of the first matrix (11), which generates an element in the second matrix (12), which displaces p/2 elements horizontally or p/2 elements vertically to form the second matrix (12).

4. The method according to claim 1, characterized in that the first reduction transformation is performed with overlap, where each element sector of the first matrix (11), which generates an element in the second matrix (12), displaces one element horizontally or one element vertically to form the second matrix (12).

5. The method according to claim 1, characterized in that the first amplification transformation has a p:q amplification ratio; the value of the q element to be generated being determined as follows: a p sector of elements from the first matrix (11) is taken to generate p×q new elements in the second matrix (12); the highest value of the p elements is determined, then the value of each p element is divided by the highest value and is normalized by 100, and the value obtained is placed q times in the second matrix's (12) corresponding sector.

6. The method according to claim 1, characterized in that the truncated ramp function has input values, where values above 20% of maximum value take on a value of 100, or maximum; values below 20% are multiplied by the ramp function, with a slope m=5; so any value between 0 and less than 20 is multiplied by 5, and in this way the value of each element of the second matrix (12) is transformed into a value in the element of the third matrix (13).

7. The method according to claim 1, characterized in that the discretized Gaussian filter comprises multiplying each of the elements in the third matrix (13) by the values set in a matrix section of the discretized Gaussian filter, which generates a new value in each element, which is linearly dependent on the original value and on surrounding elements; the discretized Gaussian filter is modeled by an x×y matrix with element values that are dependent on the size of the matrix, and which are obtained experimentally; For the center of the x×y matrix the value normalized to 1 is used, and the peripheral values are defined between 0 and 1, where the discretized Gaussian filter is based on the formula: $z=b*\exp(-a*x^2-a*y^2)$; where the constants a and b are experimentally obtained.

8. The method according to claim 1, characterized in that the binarization is of a positive type, meaning that if the element's value is greater than 50% of the fifth matrix's (15) maximum-value element, this element becomes 1, and otherwise becomes 0; and another of the negative type, where if the element's value is greater than 50% of the fifth matrix's (15) maximum value, this element becomes 0, and otherwise it becomes 1; For the application of the binarization, first the maximum value within the elements of the fifth matrix (15) is determined, and then a pattern of the types of positive or negative binarizations is defined for each element of the fifth matrix (15), which is performed randomly, allocating 50% to each type of binarization.

9. The method according to claim 1, characterized in that the seventh binarization transformation is of the positive type.

10. The method according to claim 1, characterized in that the sequential stream of sorted input data (10) may comprise a sequence of audio or video data or a digital image.

* * * * *